(12) United States Patent
Rubin

(10) Patent No.: US 9,436,912 B1
(45) Date of Patent: Sep. 6, 2016

(54) SYMMETRIC SCHEMA INSTANTIATION METHOD FOR USE IN A CASE-BASED REASONING SYSTEM

(71) Applicant: The United States of America as represented by the Secretary of the Navy, Washington, DC (US)

(72) Inventor: Stuart H. Rubin, San Diego, CA (US)

(73) Assignee: THE UNITED STATES OF AMERICA AS REPRESENTED BY THE SECRETARY OF THE NAVY, Washington, DC (US)

( * ) Notice: Subject to any disclaimer, the term of this patent is extended or adjusted under 35 U.S.C. 154(b) by 540 days.

(21) Appl. No.: 14/058,925

(22) Filed: Oct. 21, 2013

Related U.S. Application Data

(63) Continuation-in-part of application No. 13/734,669, filed on Jan. 4, 2013.

(51) Int. Cl.
*G06F 17/00* (2006.01)
*G06N 5/02* (2006.01)

(52) U.S. Cl.
CPC .................................... *G06N 5/02* (2013.01)

(58) Field of Classification Search
None
See application file for complete search history.

(56) References Cited

U.S. PATENT DOCUMENTS

| | | | | |
|---|---|---|---|---|
| 5,402,524 A * | 3/1995 | Bauman | ............. | G06N 5/043 706/45 |
| 7,047,226 B2 * | 5/2006 | Rubin | ............. | G06N 5/025 706/46 |
| 7,926,029 B1 * | 4/2011 | Stoyen | ............. | G06F 8/20 706/11 |
| 8,073,804 B1 * | 12/2011 | Rubin | ............. | G06N 5/04 706/48 |
| 8,117,147 B1 * | 2/2012 | Rubin | ............. | G06N 5/04 706/47 |
| 8,250,022 B1 * | 8/2012 | Rubin | ............. | G06N 99/005 706/60 |
| 8,280,831 B1 * | 10/2012 | Rubin | ............. | G06N 5/04 706/12 |
| 8,285,728 B1 * | 10/2012 | Rubin | ............. | G06F 17/30734 707/749 |
| 8,315,958 B1 * | 11/2012 | Rubin | ............. | G06N 5/048 706/13 |
| 8,447,720 B1 * | 5/2013 | Rubin | ............. | G06N 5/025 706/46 |

(Continued)

OTHER PUBLICATIONS

Rubin et al., "Randomizing the Knowledge Acquisition Bottleneck", Systems, Man, and Cybernetics, 1999: IEEE SMC '99 Conference Proceedings. 1999 IEEE International Conference on, pp. 790-795 (vol. 5), Oct. 12, 1999-Oct. 15, 1999.*

(Continued)

*Primary Examiner* — Kakali Chaki
*Assistant Examiner* — Fuming Wu
(74) *Attorney, Agent, or Firm* — Spawar Systems Center Pacific; Kyle Eppele; Ryan J. Friedl

(57) ABSTRACT

A method involves providing a parent schema, generating a plurality of distinct and domain-specific instantiations of the parent schema, user-validating at least two of the instantiations of the parent schema, and creating a symmetric schema by combining the user-validated instantiations of the parent schema. The parent schema and the instantiations of the parent schema may be user-provided or iteratively generated. The parent schema contains more than one tractable search spaces. Prior to user-validating the instantiations of the parent schema, they may be optimized using domain-specific knowledge. Additionally, one or more existing Boolean features in one or more cases of a case-based reasoning system may be replaced with the instantiations of the parent schema and non-zero weights for the cases may evolve that include the instantiations of the parent schema. The method may also include generating instantiations of the created symmetric schema.

17 Claims, 8 Drawing Sheets

(56) References Cited

U.S. PATENT DOCUMENTS

| | | | | |
|---|---|---|---|---|
| 8,489,648 | B1* | 7/2013 | Rubin | G06F 8/36 707/802 |
| 9,299,025 | B1* | 3/2016 | Rubin | G06N 5/025 |
| 2010/0011364 | A1* | 1/2010 | Gerovac | G06F 9/5011 718/104 |
| 2010/0095265 | A1* | 4/2010 | Ewing | G06F 17/30368 717/100 |

OTHER PUBLICATIONS

Rubin, Stuart H., "On Randomization and Discovery", Journal of Informational Sciences, vol. 177, issue 1, pp. 170-191, Jan. 2007.

Rubin, Stuart H., "Computing With Words", IEEE Transactions on Systems, Man, and Cybernetics—Part B: Cybernetics, vol. 29, No. 4, pp. 518-524, Aug. 1999.

Rubin, S.H., Murthy, S.N.J., Smith, N.H., and Trajkovic, L., "KASER: Knowledge Amplification by Structured Expert Randomization," IEEE Transactions on Systems, Man, and Cybernetics—Part B: Cybernetics, vol. 34, No. 6, pp. 2317-2329, Dec. 2004.

Chaitin, G.J., "Randomness and Mathmatical Proof," Sci. Amer., vol. 232, No. 5, pp. 47-52, 1975.

Rubin, Stuart H., Chen, S., and Shyu, M., "Field Effect Natural Language Semantic Mapping", IEEE International Conference on Systems, Man, and Cybernetics, vol. 3. pp. 2483-2487, Oct. 5-8, 2003.

* cited by examiner

```
Define Boolean Symmetric_Feature (var x, t1, t2; t):
   /* In general, schemas may call other schemas. */

Randomly Select x  {pressure, humidity};

Randomly Select t1, t2  {t, t-1, t-2}
      Such That t2 > t1;

If x[t2] Randomly Select op  {>, <} x[t1]
      Return (1);

Return (0).
```

```
Define Boolean Pressure_Decrease_Feature (pressure, t):

If pressure(t) < pressure(t-1)

Return (1);

Return (0).
```

SYMMETRIC SCHEMA INSTANTIATION METHOD FOR USE IN A CASE-BASED REASONING SYSTEM

CROSS-REFERENCES TO RELATED APPLICATIONS

This application is a continuation-in-part of commonly-assigned U.S. patent application Ser. No. 13/734,669 filed Jan. 4, 2013, entitled "Case-Based Reasoning System Using Case Generalization Method", and also is a continuation-in-part of commonly-assigned U.S. patent application Ser. No. 14/037,640 filed Sep. 26, 2013, entitled "Case-Based Reasoning System Using Normalized Weight Vectors", the content of both being fully incorporated by reference herein.

FEDERALLY SPONSORED RESEARCH AND DEVELOPMENT

The Symmetric Schema Instantiation Method for Use in a Case-Based Reasoning System is assigned to the United States Government and is available for licensing for commercial purposes. Licensing and technical inquiries may be directed to the Office of Research and Technical Applications, Space and Naval Warfare Systems Center, Pacific, Code 72120, San Diego, Calif., 92152; voice (619) 553-2778; email ssc_pac_T2@navy.mil. Reference Navy Case No. 102004.

BACKGROUND

The current explosion in sensor data has brought a tipping point in information, surveillance, and reconnaissance technologies. This problem can be addressed through the insertion of novel artificial intelligence-based methodologies. The nature of the problem is that heterogeneous data (i.e., structured and unstructured) must be reduced in size by an order of magnitude prior to dissemination.

The scope of the problem is to define a novel computational intelligence methodology, which can learn to map distributed heterogeneous data to actionable meaning for dissemination. This methodology must be practical and successfully scale for development. A need exists for a system and corresponding methodology that provides for autonomous evolution of improved features.

BRIEF DESCRIPTION OF THE DRAWINGS

FIG. 8 shows a diagram illustrating a simple symmetric weather features schema in accordance with the Symmetric Schema Instantiation Method for Use in a Case-Based Reasoning System.

FIG. 9 shows a diagram illustrating a pressure instance of the simple symmetric weather features schema shown in FIG. 8.

DETAILED DESCRIPTION OF SOME EMBODIMENTS

Figure 1:
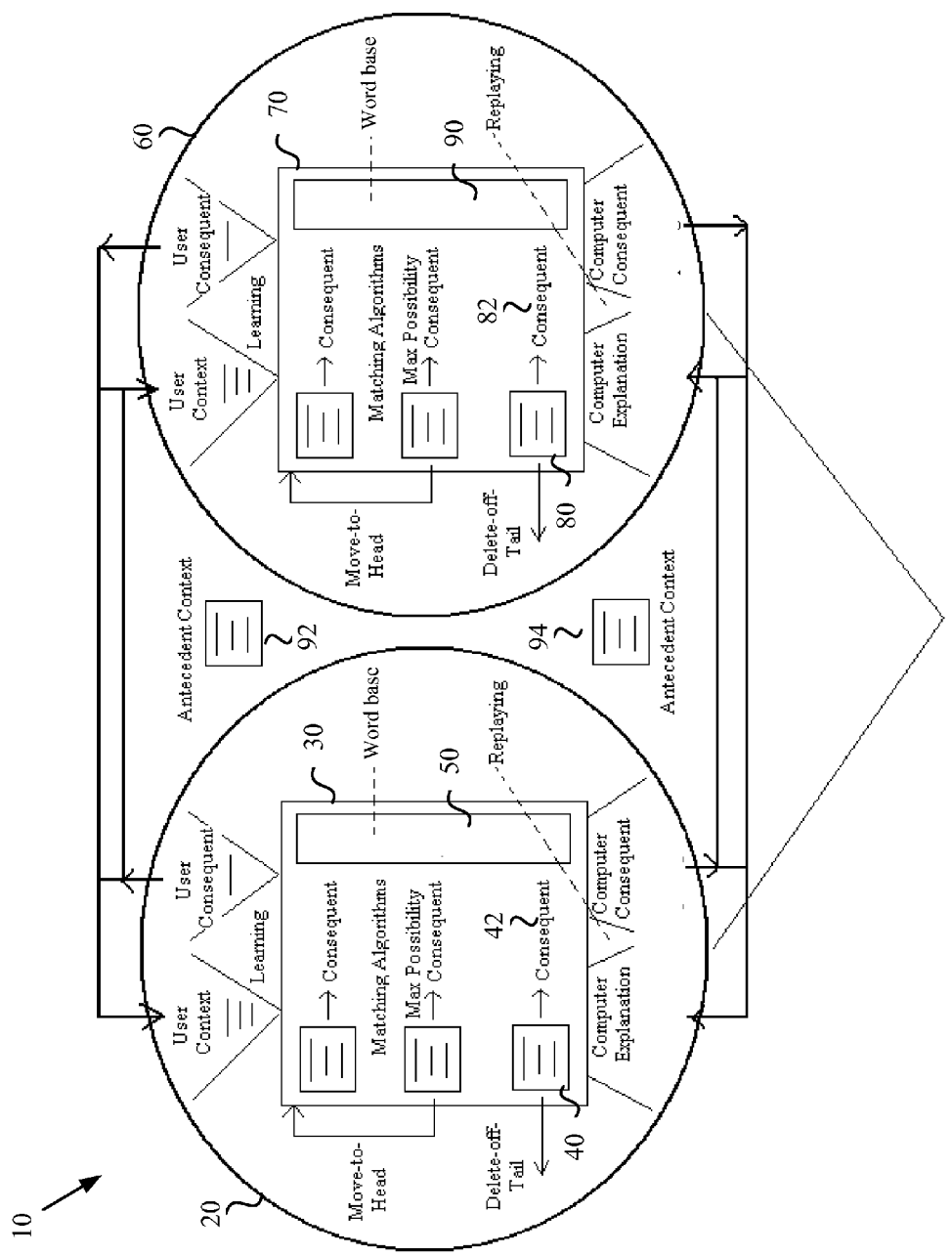
FIG. 1 shows a block diagram of the operation of one embodiment of a system in accordance with the Symmetric Schema Instantiation Method for Use in a Case-Based Reasoning System.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Further, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the disclosed embodiments include process steps and instructions described herein in the form of an algorithm. It should be noted that the process steps and instructions of the embodiments could be embodied in software, firmware or hardware, and when embodied in software, could be downloaded to reside on and be operated from different platforms used by a variety of operating systems. Different parts of the algorithm could be embodied in different elements of hardware or software, for example, as in a distributed system.

The subject matter discussed herein pertains to the enhancement of weighted case based reasoning (CBR) systems through the evolution of higher-quality Boolean features for the prediction of a dependency category. The methodology has application for tasking, collection, processing, exploitation, and dissemination, or TCPED. As an example, Boolean features may derive from exploitation and processing systems. They can support all types of intelligence processing. Thus, they enable analyst expertise to be captured for reuse—saving on the cost and inefficiencies of raw human labor.

Referring now to FIG. 1, FIG. 1 shows a block diagram of one embodiment of a system 10 that may be used in accordance with the methods described herein. System 10 may include a first computing system 20 and a second computing system 60. System 10 is shown in a networked, multi-processor, distributed computing configuration. It should be recognized that system 10 may include substantially more networked computing systems 20 and 60 than those shown in FIG. 1. Additional computing systems allow for increased learning as system 10 scales upward.

Computing systems 20 and 60 may be substantially similar, and may be configured with the appropriate software modules to perform methods as discussed herein. The term "module" generally refers to a software module. A module may be implemented as a collection of routines and data structures that performs particular tasks or implements a particular abstract data type. Modules generally are composed of two parts. First, a software module may list the constants, data types, variables, and routines that may be accessed by other modules or routines. Second, a module may be configured as an implementation, which may be private (i.e., accessible only to the module), and which contains the source code that actually implements the routines or subroutines upon which the module is based. Thus, the use of the term "module" herein, indicates reference to such software modules or implementations thereof. The terms "module" and "software module" can be utilized interchangeably with one another to describe the same element or feature.

The embodiments described herein may be implemented as a series of modules, either functioning alone or in concert with physical electronic and computer hardware devices. Such modules may be utilized separately and/or together locally and/or remotely to form a program product thereof, that may be implemented through signal-bearing media, including transmission media and recordable media. The methods described herein may be implemented as a program product comprised of a plurality of such modules, which can be interactively displayed for a user on a display screen of a data-processing system (e.g., computer). Such interactivity may be provided by a specialized graphical user interface (not shown).

System 20 may include a case base system 30 including a plurality of cases having one or more antecedents 40 and one or more associated consequents 42. Antecedents 40 may be comprised of one or more independent variables that include Boolean and non-Boolean variables. System 30 may further include an optional word base 50. The cases and word base 50 may be stored in memory within computing system 20. Similarly, system 60 may include a case base system 70 including a plurality of cases having one or more antecedents 80 and one or more associated consequents 82. Consequents 82 may comprise a domain specific dependency variable. System 70 may further include an optional word base 90. The cases and word base 90 may be stored in memory within computing system 70.

In operation, user-supplied contexts are input into case base systems 20 and/or 60. The user-supplied contexts may comprise one or more contextual antecedents, such as contextual antecedents 92 and 94, which are compared to the one or more case antecedents, such as 40 or 80, that are stored in the case base.

The cases stored in the case base include case antecedents and case consequents, both of which are previously supplied by a user, either during training of the system or during real-time system operation. A case involving the best match of the case antecedents with the contextual antecedents is then determined. The consequent of the selected case is then displayed to a user, and, if the displayed consequent is not a question, the selected case is moved to the head of the case base, as indicated in FIG. 1. In the event memory constraints occur, least-frequently-used cases are deleted from the tail of the case base, as indicated (or moved to a backup secondary memory device such as an optical jukebox). In some embodiments, in a training mode, the system may display, in addition to the case consequent(s) an explanation of the case antecedent(s) that were matched with the contextual antecedent(s) supplied by the user.

Some general rules that may be implemented into the system and method disclosed herein may include: 1) cases may be learned if the user agrees with the consequent or not—so long as they do not duplicate an existing case, in which case the existing case is simply moved to the head of the queue; 2) cases are moved to the head of the queue so that the most-recently referenced case will break any ties among cases having the same computed possibility and so that the least-recently referenced cases will fall to the tail where they may be expunged with minimal functional loss; 3) consequents that ask a question however are not moved to the head because they are not as valuable as regular cases when (if) case memory fills up; and 4) consequents may be specified as "unknown" for consideration for subsequent specification (or not), when they may become known.

Figure 2:
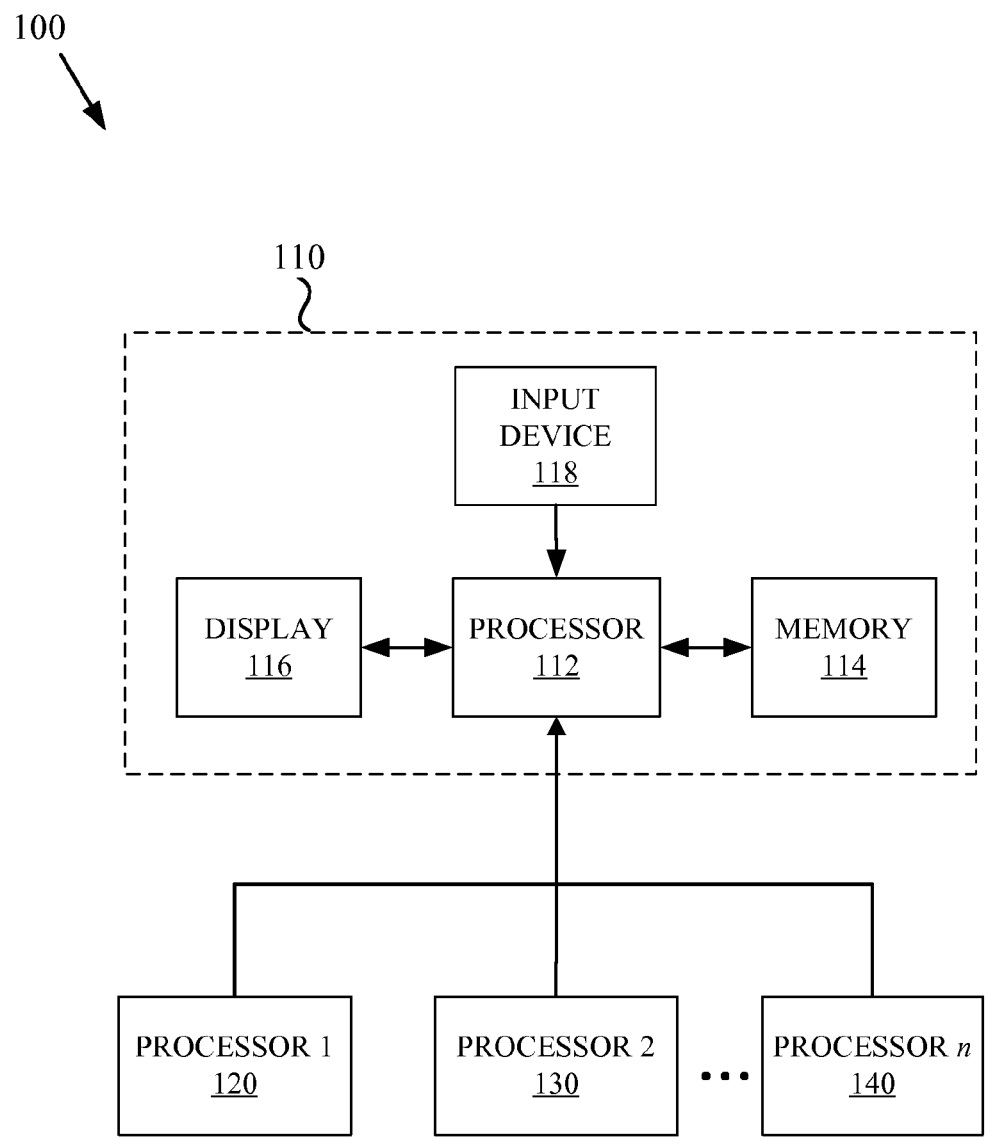
FIG. 2 shows a block diagram of an embodiment of a distributed processor system in accordance with the Symmetric Schema Instantiation Method for Use in a Case-Based Reasoning System.

FIG. 2 shows a block diagram of an embodiment of a distributed processor system 100 in accordance with the methods disclosed herein. The speed of a case-based reasoning system can be increased through the use of associative memory and/or parallel (distributed) processors, such as shown in FIG. 2. Furthermore, an increase in speed can be obtained if information stores are subdivided for the case knowledge by domain for threaded parallel processing. This is known as segmenting the domain. Such segmentation can be automatically managed by inferred symbolic heuristics, but this will necessarily introduce much redundancy into the system—albeit brain-like. The idea here is to match the candidate case to be acquired against the dynamic case residing at the head of each segment. This case is acquired by those segments, whose head most-closely (not perfectly) matches it based on their possibilities.

Moreover, it is acquired by all segments whose current head is within $\delta$ of this new case, where $\delta$ is dynamically defined by the minimal possibility differential among case-base heads. However, whenever the computed possibility between the new case and the case-base heads is greater than the current maximum among case-base heads, $\delta$, so that the new case falls outside of existing segments, the case is acquired by creating a new segment (i.e., given sufficient parallel nodes/space)—otherwise, the least-recently—used (LRU) segment is expunged and replaced. Thus, a system, such as system 10 or 100, may be cold-started with a pair of non-redundant segments.

Further, given a system such as system 100, it is possible for one or more computers to chat back and forth with each other if the output of each can serve to augment the input for another. This process is also brain-like because here the cases will acquire knowledge on how to solve a problem (e.g., by way of asking questions)—not just domain-specific knowledge. This respects the mathematical process of randomization. Every consequent (or response to a consequent) may be either terminal or non-monotonic in its action—as determined by whether or not it elicits additional knowledge from the user (or other subsystem) to augment the on-going context. The consequent(s) produced by this iterative feedback process may be corrected, as necessary. This is knowledge amplification because knowledge begets knowledge. That is, knowledge imbued along one path of reasoning becomes subsumed along other paths of reasoning.

Feedback may play a role in the operation of the methods described herein. Feedback takes two forms: 1) consequents may raise questions, the answers to which, supplied by the users, server to augment the context; and 2) the consequents themselves may literally augment the context—again, under user control. The fact that antecedents and consequents can share the same space implies that words for both share the same words table.

Classical set theory does not allow for duplication of elements in the context or antecedent. However, sentential forms are sequence sensitive and thus differ from sets. For example, if I state, "location", you might think of a map; but, if I state, "location, location, location", you might instead think of real estate. Our system must be capable of making use of such sequence in matters of practical feedback. However, contextual duplicate words may not be counted because to do so would proportionately decrease the resultant possibility and thus result in a bad case match. Fortunately, not counting duplicates does not change the complexity of the algorithm. The context length is decreased by one for each such duplicate (i.e., when in default mode). Then, notice that traditionally deleterious cycles (e.g., a→a; a→b, b→a; etc.) become an asset because with the aforementioned feedback comes duplication in the context, which as we've witnessed can beneficially alter sentential semantics. This means that there is no need to hash to detect cycles (using stacked contexts) because such cycles are beneficial. Finally, the allowance for cycles implies that there is no need to copy the context into a buffer to facilitate data entry.

As such, system 100 may include a computer 110 having processors 120, 130, and 140 connected thereto. Computer 110 may include a processor 112, memory 114, display 116, and input device 118, such as a keyboard or mouse. System 100 may be used to provide an increase in computing capacity by allowing processor 112 to coordinate processors 120, 130, and 140 such that maximum processing capabilities are achieved.

Figure 3:
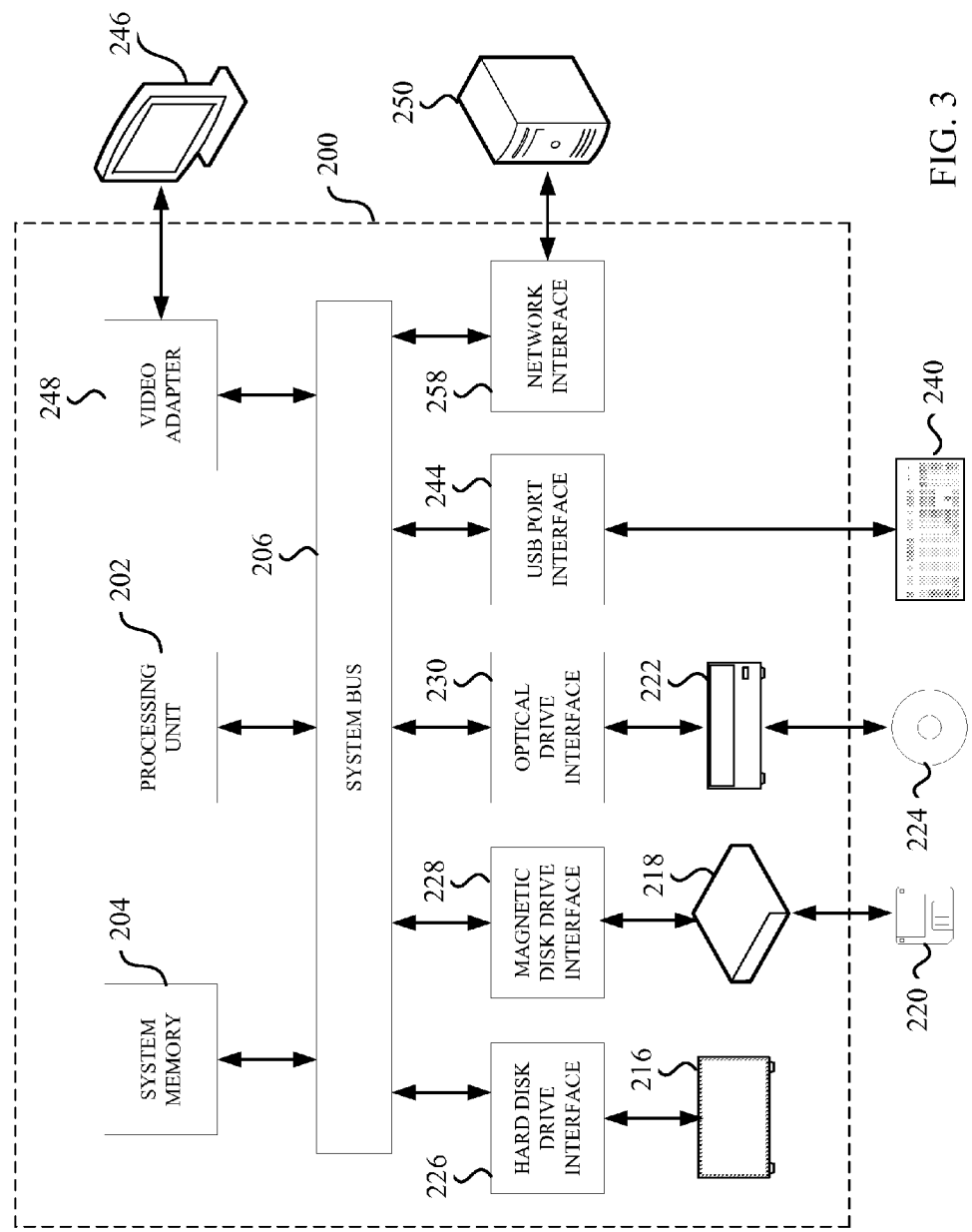
FIG. 3 shows a block diagram of an embodiment of a computing system for implementing and performing a method in accordance with the Symmetric Schema Instantiation Method for Use in a Case-Based Reasoning System.

FIG. 3 shows a block diagram of an embodiment of a computing system that may be used to implement a method in accordance with the methods disclosed herein. FIG. 3 and the following description are intended to provide a brief, general description of a suitable computing environment in which an embodiment of the method discussed herein may be implemented. Although not required, the method will be described in the general context of computer-executable instructions, such as program modules, being executed by a personal computer.

Moreover, those skilled in the art will appreciate that embodiments of the method may be practiced with other computer system configurations, including hand-held devices, multiprocessor systems, microprocessor-based or programmable consumer electronics, networked personal computers, minicomputers, mainframe computers, and the like. Embodiments of the method may also be practiced in distributed computing environments where tasks are performed by remote processing devices that are linked through a communications network (such as shown in FIG. 2). In a distributed computing environment, program modules may be located on both local and remote memory storage devices.

System 200 may include a general-purpose computing device in the form of a conventional personal computer 200, which includes processing unit 202, system memory 204, and system bus 206 that operatively couple various system components to other system components (e.g., system bus 206 operatively couples system memory 204 to processing unit 202). Examples of system bus 206 include a memory bus, memory bus controller, peripheral bus and local bus using any of a variety of known bus structures. System memory 204 may include read only memory, random access memory, and a basic input/output system.

System 200 further includes hard disk drive 216 for reading from and writing to a hard disk (not shown) a magnetic disk drive 218 for reading from or writing to a removable magnetic disk 220 (e.g., 4.5-inch disk), and an optical disk drive 222 for reading from and writing to a removable optical disk 224 (e.g., CD-ROM and DVD). Hard disk drive 216, magnetic disk drive 218 and optical disk drive 222 are operatively connected to system bus 206 via hard disk drive interface 226, magnetic disk drive interface 228 and optical drive interface 230, respectively. The drives and their associated computer-readable media provide non-volatile storage of computer readable instructions, information structures, program modules and other information for personal computer 200.

The method steps of embodiments may be stored on a hard disk, magnetic disk 220, and optical disk 224. Although the exemplary environment described herein employs a hard disk, magnetic disk 220 and optical disk 224, it should be appreciated by those skilled in the art that other types of computer readable media that may store information accessible by a computer, (e.g., magnetic cassettes, flash memory cards, digital video disks, Bernoulli cartridges, random access memories (RAMs), and read only memories (ROMs)) may also be used in the exemplary operating environment without departing from the scope or spirit of embodiments of the method.

A user may enter commands and information into personal computer 200 via input devices such as keyboard 240 and pointing devices (e.g., mouse and trackball) (not shown in FIG. 3). Examples of input devices include a microphone, joystick, game pad, and satellite dish. Input devices may be operatively connected to processing unit 202 via universal serial bus (USB) port interface 244 that is operatively connected to system bus 206. Input devices may also be operatively connected to processing unit 202 via other interfaces (e.g., parallel port, serial port and game port) that are operatively connected to system bus 206. Monitor 246 is operatively connected to system bus 206 via video adapter 248.

Other peripheral devices (e.g., speakers and printers) may be operatively connected to system 200 via other interfaces. System 200 may operate in a networked environment using logical connections to one or more remote computers such as remote computer 250 via network a network, such as a local area network, wide area network, and wireless network. Examples of remote computer 250 include a personal computer, server, router, networked personal computer, peer device, and network node.

Features can capture when associated dependencies should tag data and, in combination, with what tag. This can define domain-specific intelligence as part of an iterative inference engine through the use of cloud computing. Feature evolution is transparent because the case dependencies are partitioned into categories. Cases having the same dependency are assigned greater weights on their variables (features) that have near similar normalized values. Conversely, cases having distinct dependencies are assigned greater weights on their variables (features) that have the most different normalized values.

Features derive from schema. The instantiation of these schemata can be conditioned to pass minimal-length messages via cloud-based computing. This can satisfy most bandwidth constraints. It is always better to create the maximum number of schemas than to rely on random schema instantiation. This is because the knowledge embodied by these schemas serves to minimize search. Schema instances are subject to peephole optimization, or more generally, to optimization by a disjoint feature-based CBR system (running as a service in a cloud).

Boolean features can be more rapidly evolved through the symmetric instantiation of schema. In this bottom-up approach, optimized distinct instances of the same parent schema (i.e., species), which survive the test of time are recombined to create a novel, but smaller search space (schema). Instances of these more-constrained recombinant schema are more likely to be valid than are instances of their parent. Thus, this bottom-up approach is self-accelerating—speeding up the evolution of symmetric features.

Symmetric schema may be logically managed, where their utility is based on the latest number of retained features produced from them. The faster and in particular, the greater the number of processors, the less exacting can be the schema definition languages imposition on the analysts. This means that the methodology can utilize virtually all of the computational resources made available to it (e.g., the cloud).

Furthermore, the methodology is unlike genetic algorithms, which employ static representations (e.g., bit strings), crossovers, and mutations. Rather, this methodology captures and incorporates distributed team analyst knowledge, expressed using dynamic schema-definition languages, producing features with evolving weights, accelerated by symmetric instantiation, and capturing and evolving all knowledge produced for reuse and self-application in a heterogeneous distributed environment.

Networks of case bases allow one bases' fired dependency category to serve as another's situational feature. Other features follow from the instantiation of domain-specific schema. For example, a temperature variable might need to distinguish the three natural states of water—solid, liquid, and gas. Here are a few tuples that serve to illustrate a simple schema and its instantiations, Schema: (Temperature ° F., Freezing?, Boiling?), (32°, 1, 0), (72°, 0, 0), and (212°, 0, 1). The use of Boolean features is very common and effective as a descriptor.

As few as 20 Boolean features can provide universal situational identifications. For example, a parlor game exists called, "20 questions". Players take turns asking questions, which can be answered with a simple "Yes" or "No". The information, as measured by Shannon's entropy statistic, needed to identify an arbitrary object, from among $2^{20}$ objects, is at most 20 bits. The best questions will divide the field of remaining choices by two each time. Indeed, this is how binary search algorithms operate. Transforming this result, if binary decision points can differentiate an arbitrary object, then Boolean features can similarly characterize it. The better the questions, or equivalently the better the Boolean features the fewer that will be needed on average.

While these Boolean features are simplistic, they can be far more complex. For example, consider boosted/bagged neural networks, trained to recognize a particular face over streaming video. Note that if a network of architecturally distinct subsystems is trained, it is called, boosting. However, if identical subsystems are given distinct training, it is called bagging. Schemas define alternative weight vectors, which program the neural networks recognition capabilities. Such weight vectors are obtained on the basis of external training. Furthermore, Zero Instruction Set Computer (ZISC) hardware can provide more than enough speed for real-time full-motion HD video Boolean feature recognition (e.g., less than 10 microseconds).

Boolean features may derive from satellite communications (SATCOM) systems, DCGS-N, and other exploitation and processing systems. Boolean features can support multiple types of intelligence areas, such as signals intelligence (SIGINT), imagery intelligence (IMINT), and acoustic intelligence (ACINT). Thus, the methodology can provide the needed capabilities for the future.

A new case is formed from the triggered features (i.e., both schemata instances and advertised dependencies) and the analyst-supplied action dependency. This machine training makes more efficient use of existing analysts through the capture and reuse of their expertise by the system as mediated through cloud-based architectures. The ISR tipping point continues to increase the demand for additional intelligence analysts to perform TCPED mission functions in traditional ways. The expertise for the human piece of the intelligence analysis and exploitation that will be needed must be effectively captured for reuse, or we will not have the manpower to reduce the volumes of data that must be moved around.

Notice the advantage provided by iterative processing using an inference engine. That is, each iteration of the inference engine can modify the data stream by transforming it with the results of its processing (i.e., tagging). Such tagging can result in the iterative expansion and contraction of the grammatical object. This defines a universal, or Type 0, grammar. It then follows that no semantics is theoretically too sophisticated for it to effectively capture and process.

Tags can also be formed by reaching back in the data stream and using previous processing results to tag the current stream. For example, once the data was tagged with "Force Status?" the set of features that is triggered on the next iteration of the inference engine recognizes that a request for information was sent to a federated cloud. What would a trained analyst do at this point? She might notice from the reach-back that no hostile forces are in the vicinity. Knowing this and that no problems are indicated is sufficient to enable the analyst to tag the data stream with "Friend". This message is subsequently routed back to the cloud that made the request. This is defined as an executable tag, meaning that it is transmitted.

Notice that this methodology provides for the iterative fusion and reduction of multiple data streams using federated clouds running software as a service. Processing is done using the clouds platform as a service, which can execute in real time. One key to the success of the full-scale methodology is providing the analysts with an easy to use front end that (1) can capture their observations and decisions in software for reuse and (2) can execute as a service in the cloud environment. The creation of dependencies and most Boolean features does not require excessively complex software. Such software is said to be lightweight or thin-client because it can be composed exclusively on the client's platform.

The qualitative statement of intelligence needs derives transparently from the inference engine in finding the best match for the specified contextual situation. The commander's intent and mission objectives are embedded in a replay of analyst actions. They are not literally defined per se, but rather are an emergent property of system complexity.

Figure 4:
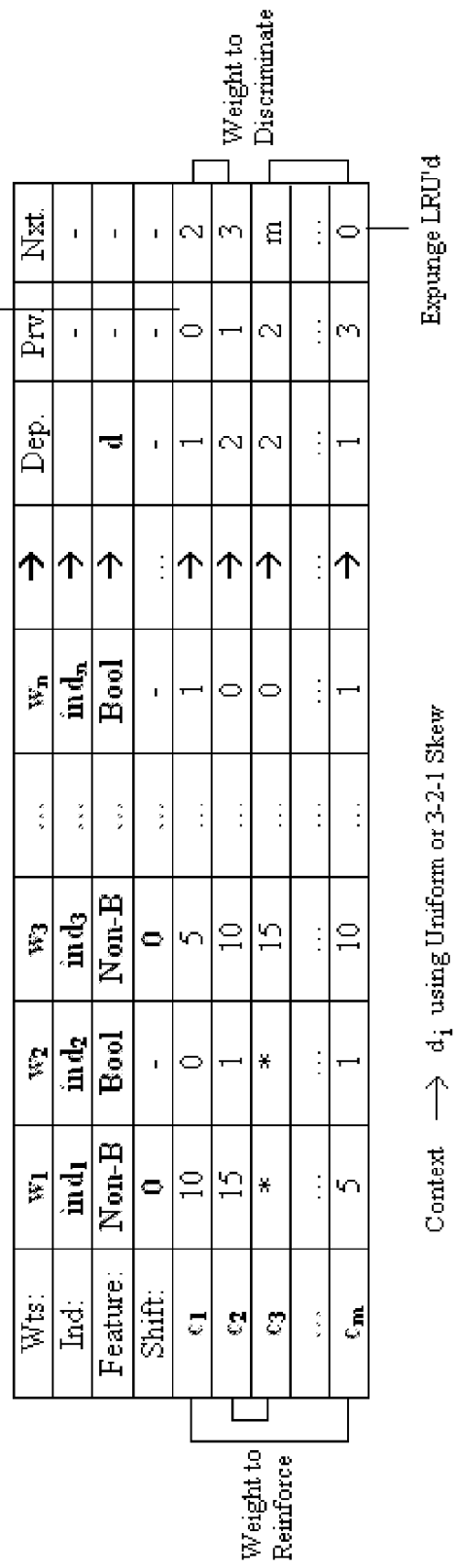
FIG. 4 shows a diagram illustrating the evolution of weighted situational variables in accordance with the Symmetric Schema Instantiation Method for Use in a Case-Based Reasoning System.

Once schemas and cases are specified by the analysts, the evolution of better features is transparent. This is possible because the cases are partitioned into categories on the basis of their dependencies. Cases having the same dependency are assigned greater weights on their variables (features) that have near similar normalized values. Conversely, cases having distinct dependencies are assigned greater weights on their variables (features) that have the most different normalized values. This supports the evolution of the ideal feature set, occurs in the cloud, and converges on the capture of causality. Causality takes the form of a weighted set of appropriate Boolean features. Predicted dependency categories, found to be in error, are re-acquired as new (non deterministic) cases having correct dependencies. The situational part of these new cases defines a contextual well for matching similar cases. The concept is illustrated by diagram 300 shown in FIG. 4.

The unique case-based weighted inference engine iteratively tags and removes tags from the data to evolve a simulation of our cognitive processes. Traditional CBR systems were designed to do this, but our novel CBR system autonomously evolves better features and more optimal weights. It also embodies data management to rank the utility of each acquired and fired case through logical movement. This also enables the square-root comparison method to work using relatively little data. Moreover, it can work with multiple alternative actions (i.e., non determinism).

Knowledge acquisition is far easier than it would be using an expert system. Analysts could not work with the latter due to the inherent complexity of capturing causality. Moreover, unlike conventional programming, analysts need not be exact when specifying schemas. That is, the crispness associated with conventional computer programming is mollified to form a fuzzy space of alternatives. Our complex system may pass messages back and forth internally and between clouds before allowing a recommendation to emerge in satisfaction of the commander's intent and mission objectives. One property of the output of such a system is that it can be trained to meet most bandwidth constraints by virtue of its exercise by the analyst(s).

Through careful schema definition and instantiation, many features can be generated for exploration. This is a top-down approach. Note that it is preferable to generate more schemas than rely on schema instances to cover the schema search space. This is because having a greater number of schema templates embodies greater knowledge, which serves to tractably constrain the search space. That knowledge is not in the form of difficult to maintain rules, but rather takes the form of contextually-rich templates. A schema is literally worth a thousand rules.

Figure 5:
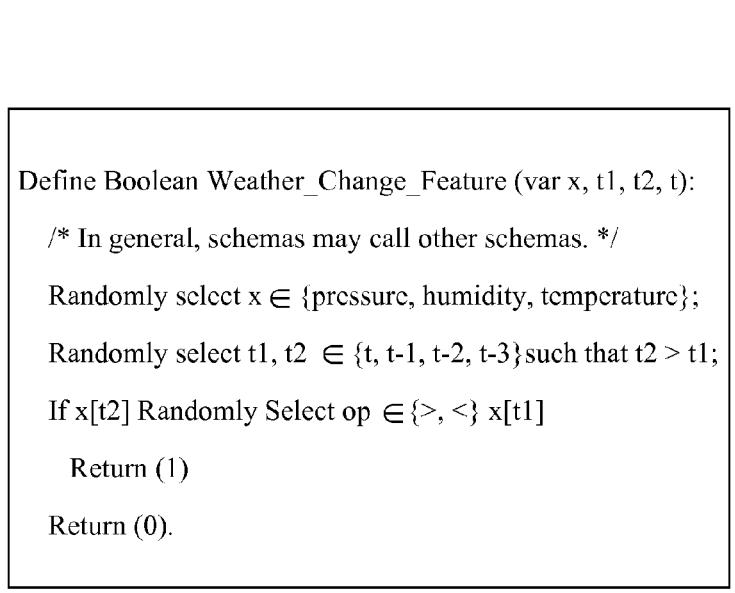
FIG. 5 shows a diagram illustrating a simple weather features schema in accordance with the Symmetric Schema Instantiation Method for Use in a Case-Based Reasoning System.

A simple schema 400 is presented in FIG. 5, which is aligned with meteorological information. Here, an analyst has created a schema to detect weather changes in the form of Boolean features. The search space for this schema is 3×6×2=36 possible instances. The first random select statement allows for three choices (i.e., for pressure, humidity, or temperature). The six combinations for the second random select statement is derived from taking n=4 things, r=2 at a time, where the number of combinations, c, is defined by, $$c = \frac{n!}{r!(n-r)!}.$$

Figure 6:
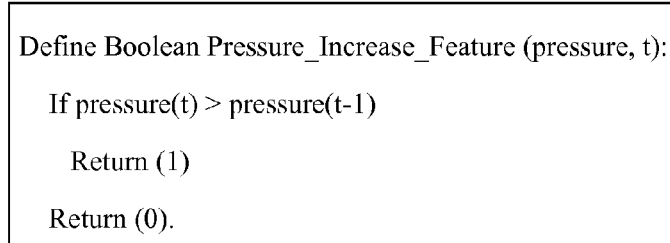
FIG. 6 shows a diagram illustrating a pressure instance of the simple weather features schema shown in FIG. 5.
Figure 7:
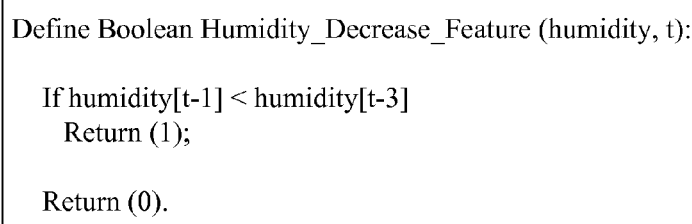
FIG. 7 shows a diagram illustrating a humidity instance of the simple weather features schema shown in FIG. 5.

Finally, we see that there are two random choices for the final set of relational operators, $\{>, <\}$. FIGS. 6 and 7 show sample schemas 500 and 600, respectively, which are instances of their parent schema 400 shown in FIG. 5. Schemas 500 and 600 may be automatically discovered and validated through computational search.

To illustrate the importance of representation to computational efficiency, consider the constraint, "Such That t2>t1" in FIG. 2. By realizing that t2>t1 is symmetric (read redundant) with t2<t1, the analyst cuts the search space, and thus the search time, by at least half. That is, this realization enables the analyst to prune the synthesis of increasing and decreasing Boolean features from occurring twice, a priori.

The inclusion of each such constraint and each reduction in the number of alternative choices reduces the size of the search space by some scalar. Again, that is why it is computationally more efficient to minimize the amount of search by maximizing the number of schemas. This is a variant of the principle known in numerical analysis as the inverse triangle inequality. Here, $\|x\|+\|y\| \leq \|x+y\|$, where the norm, indicated by the parallel brackets, refers to the magnitude of a schemas search space (e.g., 36 for FIG. 5). The summing of schemas x and y, before taking the norm (right-hand side), implies the relaxing of one or more search constraints so that the resulting single schema covers at least the same search space as the union of its constituent individual schemas (left-hand side). Schema sizes, in bits, are constrained such that $|x+y| \leq \max\{|x|, |y|\}$. This is always possible.

Again, the use of schemas is much more analyst friendly than is the use of rule-based constraint systems. This is because it is far easier for analysts to provide examples than to correctly specify general-purpose rules (i.e., determine causality).

Schema instances may be subject to optimization before being tested as candidate features. Such optimization is generally far quicker than is the testing process. It may also pay for any stolen CPU cycles through subsequent savings in the required evaluation time. Optimization may be carried out by local domain-specific iterative transformation rules, or more global (iterative) domain-specific transformative cases. For example, the former might replace the conditional line in FIG. 7 with a shifted version, "If humidity[t]<humidity[t−2]". Similarly, transformative cases can affect the same replacement, but do so by replacing the entire case instance shown in FIG. 7. More aggressive optimizations might entail collapsing the temporal comparison interval (e.g., "If humidity[t]<humidity[t−1]"). Such optimizations and many more require the application of domain-specific knowledge. This is generally not done because it would have been properly restricted by the analyst in the defining schema.

Rule transformations are effected by expert systems, which contain detailed knowledge. Case substitutions are effected by case-based systems, which match the pattern. Pattern matching can be simple, as in this example, or quite complex—requiring domain-specific knowledge. Rule-based, so-called peephole transformation systems, while more powerful, are far more difficult to maintain; whereas, case-based transformation systems may not be sufficiently general to be useful. This suggests the use of our generalized CBR system (running as a service in a cloud) for acquiring and matching general cases for use in optimization operations. Clearly, there are going to be self-referential feedback paths here. Thus, the system must be constructed of disjoint subsystems to dampen optimization feedback paths. This is consistent with a cloud-computing environment.

So far, our schemas have been implicitly instantiated at chance (i.e., are random schema). The open question is can they be more successfully instantiated by utilizing some definition of symmetric operations (i.e., computational analogy)? The payoff here is that if symmetric operations can improve the quality of schema instance, then less CPU cycles will be lost to search. This means that the overall architecture will be of higher quality and run much faster.

Given sufficient scale, the dependency categories may be set to more or less iteratively generate schema. Thus, schema can play a direct role in their discovery. In the large (i.e., in the cloud), random search can evolve heuristic search, which is to say that knowledge begets ever-higher levels of knowledge in ever-decreasing time frames. This concept serves to illustrate the interplay between randomness and symmetry.

As is often found, a limited amount of data may be missing. The methodology described herein allows for the continuing evolution of the features and weights without unwarranted delay. Weights of zero are ignored as these are associated with new features for which the evaluation of previous case variables is not available. Features having normalized weights with the smallest evolved positive values are first to be replaced by new instances of their associated feature schema(s). Also, advertised features defined by fired dependencies can also be acquired.

The evolution of quality features can be sped up through the symmetric instantiation of schema. This is a bottom-up approach. That is, let a pair of distinct instances of the same schema (i.e., species) be evolved, or otherwise be written by analysts. Furthermore, suppose that the pair replace existing Boolean features in the same or distinct case bases and evolve non-zero weights. This implies that they are of relative quality. The pair can then be combined to create a more focused schema (i.e., one having a smaller search space) than the parent. In some embodiments, it is proper to optimize prior to recombination.

FIG. 8 presents a symmetric schema 700 that represents a union of two distinct instances, namely instantiations 500 and 600 shown in FIGS. 6 and 7. The parent schema 400 of these instances is shown in FIG. 5. The search space for this schema is 2×3×2=12 possible instances, which is one-third that of the parent. The first random select statement allows for two choices (i.e., for pressure or humidity). The three combinations for the second random select statement is again derived from taking n=3 things, r=2 at a time, or $$c = \frac{n!}{r!(n-r)!}.$$

Finally, we see that there are two random choices for the final set of relational operators, {>, <}.

One of 12 possible instances 800 of symmetric schema 700 is presented in FIG. 9. FIG. 9 shows a sample feature, which is an instance 800 of its parent schema 700 shown in FIG. 8. Note that this instance is already in optimal form.

Any instantiation of symmetric schema 700 shown in FIG. 8, is heuristically more likely to be found valid than any instantiation of its parent schema 400 shown in FIG. 5. Furthermore, symmetric induction is self-accelerating because successful instantiations spawn new schema through recombination. In this manner, symmetric instantiation can be used to speed-up the evolution of symmetric features. For example, if decreasing barometric pressure (FIG. 9) is found to be a good predictor of rain, then a symmetric instance of this feature (i.e., as mediated through schema 700 in FIG. 8) might be increasing humidity. Notice that this feature is three times more likely to be found as an instance of symmetric schema 700 shown in FIG. 8, than as an instance of the parent schema 400 shown in FIG. 5.

The choice between instantiating the schema 400 shown in FIG. 5 and symmetric schema 700 shown in FIG. 8 is defined by relative randomness vs. relative symmetry, respectively. That choice is to be dynamically made. That is, the next instantiation is made of that schema, which is currently producing the greatest number of retained (i.e., most-highly weighted) features. It is based on the operating system principle of temporal locality.

Symmetric schema may be logically managed for applicability just as are the cases. Thus, when acquired or successfully used, they are moved to the logical head of a list; but, when not successfully used, over time, they fall to the logical tail of this list, from where they are subject to being expunged and their memory space reclaimed (see FIG. 4).

Smaller, lightweight, thin-client schemas facilitate analyst specification, reuse, and thus symmetric instantiation. They collectively serve as amplifiers of analyst abilities. The potential of the methodology stems, in part, from the capability of all schema species to recursively call alternative sets of schemas. This is similar to the use of subroutines in performing common calculations. The deeper the nesting, the greater will be the potential symmetric speedup.

Of course, the parent schema must have tractable search spaces to start, in order that viable features can be found to kick-off the symmetric search process. It is also possible for analysts to define literal feature instances of the same species. The methodology then searches out combinations of such instances to evolve the parent schema.

Analysts will be given the flexibility of choice in their approach to schema specification. One can select the approach—top-down or bottom-up specification—whichever is easier for analysts to use. It is possible that both approaches will be useful to analysts.

Figure 10:
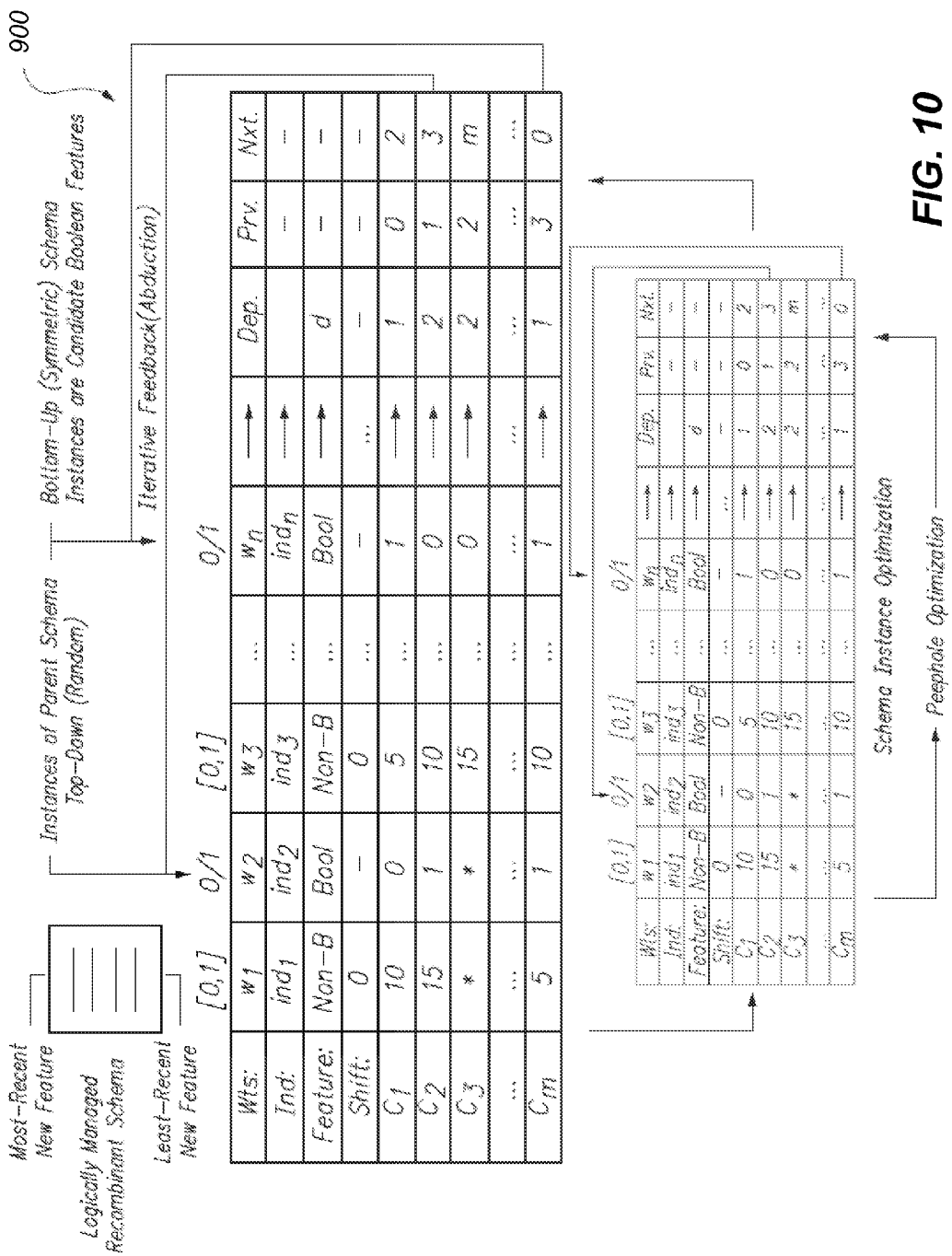
FIG. 10 shows a diagram illustrating the evolution of weighted features in accordance with the Symmetric Schema Instantiation Method for Use in a Case-Based Reasoning System.

Symmetric schema instantiation boils down to the following. The faster and in particular, the greater the number of processors, the less exacting can be the schema definition languages on the analysts. This means that the methodology can utilize virtually all of the computational resources made available to it (e.g., the cloud). Furthermore, our methodology is unlike genetic algorithms, which employ static representations (e.g., bit strings), crossovers, and mutations. Rather, our methodology captures and incorporates distributed team analyst knowledge, expressed using dynamic schema-definition languages, producing features with evolving weights, accelerated by symmetric instantiation, and capturing and evolving all knowledge produced for reuse and self-application in a heterogeneous distributed environment. FIG. 10 shows a diagram 900 depicting the interrelationship among top-down and bottom-up schema instantiation and optimization.

Figure 11:
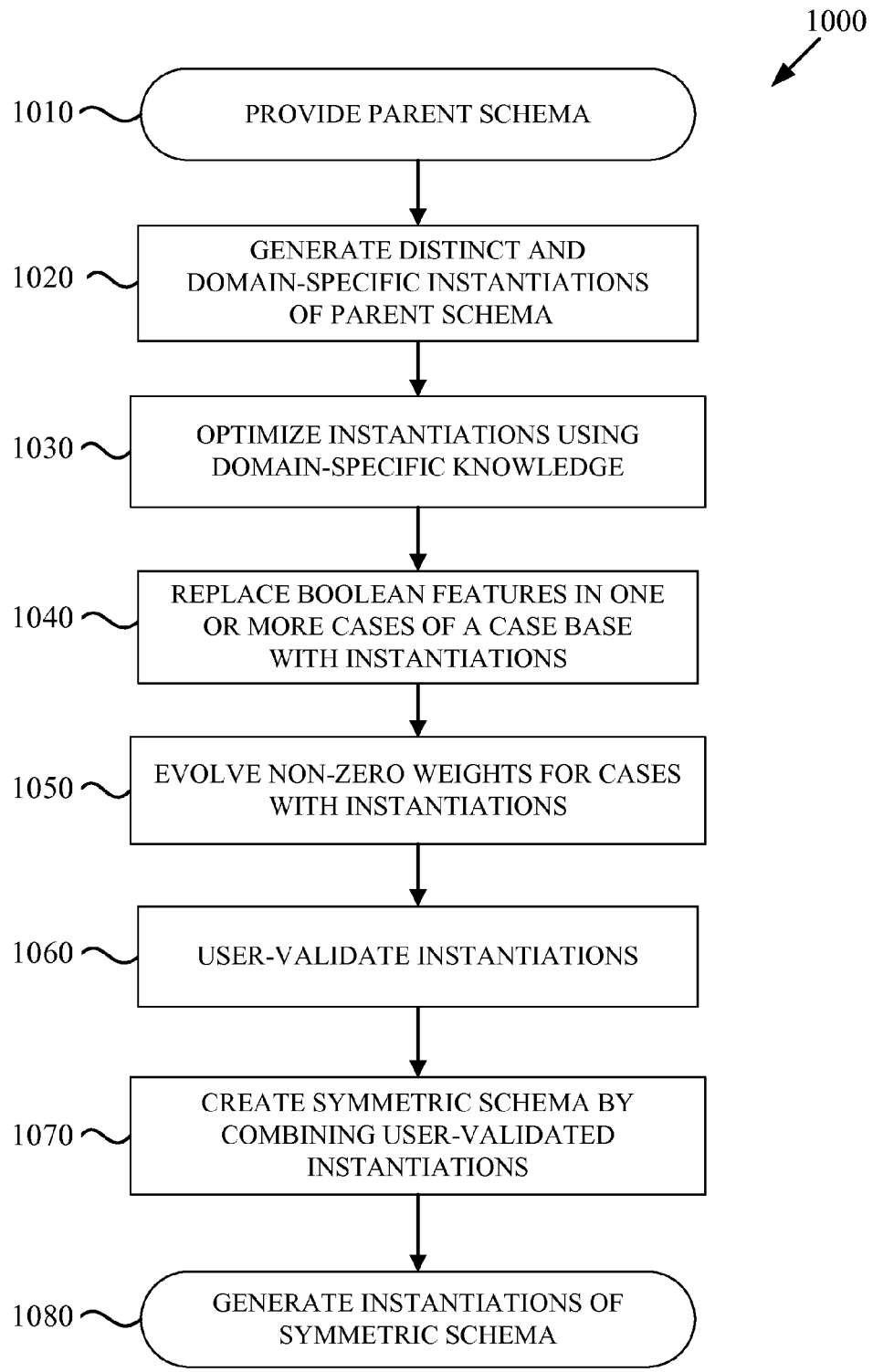
FIG. 11 shows a flowchart of an embodiment of a method in accordance with the Symmetric Schema Instantiation Method for Use in a Case-Based Reasoning System.

FIG. 11 shows flowchart of an embodiment of a method 1000 in accordance with the Symmetric Schema Instantiation Method for Use in a Case-Based Reasoning System. Some or all of the steps of method 1000 may be performed by a computer having a processing device connected thereto, such as computer 200 shown in FIG. 3 or system 100 shown in FIG. 2. As an example, method 1000 will be described with reference to FIGS. 4-10. Further, while FIG. 11 shows one embodiment of method 1000 including steps 1010-1080, other embodiments of method 1000 may contain fewer steps or more steps. Further, while in some embodiments the steps of method 1000 may be performed as shown in FIG. 11, in other embodiments the steps may be performed in a different order, or certain steps may occur simultaneously with one or more other steps.

Method 1000 may begin at step 1010, which involves providing a parent schema, such as schema 400. In some embodiments, the parent schema contains more than one tractable search spaces. Step 1020 then involves generating a plurality of distinct and domain specific instantiations of the parent schema, such as instantiations 500 and 600 of schema 400. In some embodiments, parent schema 400 and instantiations 500 and 600 are user-provided. In some embodiments, parent schema 400 and instantiations 500 and 600 are iteratively generated by a case-based reasoning system.

Method 1000 may then proceed to step 1030, which involves optimizing instantiations 500 and 600 of parent schema 400 using domain-specific knowledge. As an example, the optimization may be carried out by local domain-specific iterative transformation rules, or more global (iterative) domain-specific transformative cases. Step 1040 may then involve replacing one or more existing Boolean features in one or more cases of a case-based reasoning system with instantiations 500 and 600 of parent schema 400. Step 1050 may then involve evolving non-zero weights for the cases including instantiations 500 and 600 of parent schema 400. As an example, the replacement of existing Boolean features and the evolution of non-zero weights may be performed in accordance with the methodology described in U.S. patent application Ser. No. 14/037,640 filed Sep. 26, 2013, entitled "Case-Based Reasoning System Using Normalized Weight Vectors".

Method 1000 may then proceed to step 1060, which involves user-validating at least two of the instantiations 500 and 600 of the parent schema 400. As an example, user-validation means that, over time, the instantiations have been reviewed by one or more users and have not been rejected. Step 1070 then involves creating a symmetric schema, such as schema 700, by combining user-validated instantiations, such as instantiations 500 and 600 of the parent schema 400. Step 1080 may then involve generating an instantiation 800 of the symmetric schema 900. As an example, such an instantiation 800 may be generated by a user of a system incorporating method 1000, such as system 100 or computer 200.

Some or all of the steps of method 1000 may be stored on a non-transitory computer readable storage medium, wherein the steps are represented by computer readable programming code. The steps of method 1000 may also be computer-implemented using a programmable device, such as a computer-based system. Method 1000 may comprise instructions that, when loaded into a computer-based system, cause the system to execute the steps of method 1000. Method 1000 may be implemented using various programming languages, such as "Java", "C", or "C++".

Various storage media, such as magnetic computer disks, optical disks, and electronic memories, as well as computer readable media and computer program products, can be prepared that can contain information that can direct a device, such as a micro-controller, to implement the above-described systems and/or methods. Once an appropriate device has access to the information and programs contained on the storage media, the storage media can provide the information and programs to the device, enabling the device to perform the above-described systems and/or methods.

For example, if a computer disk containing appropriate materials, such as a source file, an object file, or an executable file, were provided to a computer, the computer could receive the information, appropriately configure itself, and perform the functions of the various systems and methods outlined in the diagrams and flowcharts above to implement the various functions. That is, the computer could receive various portions of information from the disk relating to different elements of the above-described systems and/or methods, implement the individual systems and/or methods, and coordinate the functions of the individual systems and/or methods.

The language used in the specification has been principally selected for readability and instructional purposes, and may not have been selected to delineate or circumscribe the inventive subject matter. Accordingly, the disclosure of the inventive subject matter is intended to be illustrative, but not limiting, of the scope of the invention, which is set forth in the following claims.

Further, many modifications and variations of the Symmetric Schema Instantiation Method for Use in a Case-Based Reasoning System are possible in light of the above description. Within the scope of the appended claims, the Symmetric Schema Instantiation Method for Use in a Case-Based Reasoning System may be practiced otherwise than as specifically described. Further, the scope of the claims is not limited to the implementations and embodiments disclosed herein, but extends to other implementations and embodiments as contemplated by those having ordinary skill in the art.

I claim:

1. A computer-implemented method comprising the step of:
    replacing one or more existing Boolean features in one or more cases of a case-based reasoning system with domain-specific instantiations of a parent schema;
    evolving non-zero weights for the cases including the domain-specific instantiations of the parent schema; and
    creating a symmetric schema by combining at least two distinct and domain-specific instantiations of the parent schema.

2. The computer-implemented method of claim 1 further comprising the step of, prior to creating the symmetric schema, optimizing the domain-specific instantiations of the parent schema using domain-specific knowledge.

3. The computer-implemented method of claim 1, wherein the parent schema is user-provided.

4. The computer-implemented method of claim 1, wherein the instantiations of the parent schema have been user-validated.

5. The computer-implemented method of claim 1, wherein the parent schema contains more than one tractable search spaces.

6. The computer-implemented method of claim 1 further comprising the step of generating an instantiation of the symmetric schema.

7. A non-transitory computer readable medium having a method encoded thereon represented by computer-readable programming code, the method comprising the steps of:
   providing a parent schema;
   generating a plurality of distinct and domain-specific instantiations of the parent schema;
   replacing one or more existing Boolean features in one or more cases of a case-based reasoning system with the domain-specific instantiations of the parent schema;
   evolving non-zero weights for the cases including the domain-specific instantiations of the parent schema;
   user-validating at least two of the domain-specific instantiations of the parent schema; and
   creating a symmetric schema by combining the user-validated domain-specific instantiations of the parent schema.

8. The non-transitory computer readable medium of claim 7 further comprising the step of, prior to user-validating the instantiations of the parent schema, optimizing the instantiations of the parent schema using domain-specific knowledge.

9. The non-transitory computer readable medium of claim 7, wherein the parent schema and the instantiations of the parent schema are user-provided.

10. The non-transitory computer readable medium of claim 7, wherein the parent schema and the instantiations of the parent schema are iteratively generated.

11. The non-transitory computer readable medium of claim 7, wherein the parent schema contains more than one tractable search spaces.

12. The non-transitory computer readable medium of claim 7 further comprising the step of generating an instantiation of the symmetric schema.

13. A system comprising:
   a computer having a computer input device and a display device connected thereto; and
   a plurality of distributed processors communicatively coupled to the computer wherein the computer is configured to coordinate the activities of the distributed processors, wherein each of the distributed processors is configured to maintain a case base, wherein each of the plurality of distributed processors are configured to perform a method including the steps of:
   providing a parent schema,
   generating a plurality of distinct and domain-specific instantiations of the parent schema,
   replacing one or more existing Boolean features in one or more cases of a case based reasoning system with the domain-specific instantiations of the parent schema,
   evolving non-zero weights for the cases including the domain-specific instantiations of the parent schema;
   user-validating at least two of the domain-specific instantiations of the parent schema, and
   creating a symmetric schema by combining the user-validated domain-specific instantiations of the parent schema.

14. The system of claim 13, wherein the method further comprises the step of, prior to user-validating the instantiations of the parent schema, optimizing the instantiations of the parent schema using domain-specific knowledge.

15. The system of claim 13, wherein the parent schema and the instantiations of the parent schema are user-provided.

16. The system of claim 13, wherein the parent schema contains more than one tractable search spaces.

17. The system of claim 13, wherein the method further comprises the step of generating an instantiation of the symmetric schema.

* * * * *